United States Patent
Yoshikawa

(10) Patent No.: US 7,420,747 B2
(45) Date of Patent: Sep. 2, 2008

(54) LENS DRIVE AND PROJECTOR COMPRISING LENS DRIVE

(75) Inventor: Tsutomu Yoshikawa, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 208 days.

(21) Appl. No.: 11/337,680

(22) Filed: Jan. 24, 2006

(65) Prior Publication Data

US 2006/0164610 A1    Jul. 27, 2006

(30) Foreign Application Priority Data

Jan. 25, 2005    (JP) .............................. 2005-017533

(51) Int. Cl.
*G02B 15/14* (2006.01)
(52) U.S. Cl. ...................... 359/699; 359/700
(58) Field of Classification Search ................. 359/699, 359/700, 701, 703, 704, 823, 694
See application file for complete search history.

(56) References Cited

FOREIGN PATENT DOCUMENTS

| JP | 51-30460 | 9/1976 |
| JP | 55-067716 A | 5/1980 |
| JP | 02-281244 A | 11/1990 |
| JP | 2000-241875 A | 9/2000 |
| WO | WO 02/16994 A1 | 2/2002 |

OTHER PUBLICATIONS

Japanese Office Action dated Dec. 4, 2006 with English translation (Eleven (11) pages).

*Primary Examiner*—Ricky L Mack
*Assistant Examiner*—Jack Dinh
(74) *Attorney, Agent, or Firm*—Crowell & Moring LLP

(57) ABSTRACT

This lens drive is a lens drive for moving a lens arranged in a housing, and comprises a rotating knob located out of the optical axis of the lens with a rotation axis unparallel to the optical axis of the lens and arranged outside the housing, a knob-side cam pin provided on the rotating knob, a lens-side cam pin provided to integrally move with the lens and a cam plate arranged in the housing and formed with a knob-side cam groove receiving the knob-side cam pin and a lens-side cam groove receiving the lens-side cam pin. The rotating knob is so rotated as to move the cam plate for moving the lens along the optical axis of the lens following this movement of the cam plate.

14 Claims, 11 Drawing Sheets

LENS DRIVE AND PROJECTOR COMPRISING LENS DRIVE

BACKGROUND OF THE INVENTION

1. Field of the Invention

The present invention relates to a lens drive and a projector comprising a lens drive, and more particularly, it relates to a lens drive capable of moving the lens position and a projector comprising this lens drive.

2. Description of the Background Art

A projector comprising a lens drive for moving the lens position is known in general. For example, International Patent Laying-Open No. WO02/016994, Japanese Patent Laying-Open No. 2-281244 (1990) and Japanese Patent Publication No. 51-30460 (1976) disclose such projectors.

The aforementioned International Patent Laying-Open No. WO02/016994 discloses a zoom lens apparatus (lens drive) comprising a cylindrical zoom ring storing first and second variator lens groups supported by a variator lens frame, a compensator lens group arranged between the first and second variator lens groups and supported by a compensator lens frame, a focus lens group arranged on a position closest to an image and supported by a focus lens frame and a telecentric lens group arranged on a position farthest from the image. In this zoom lens apparatus disclosed in International Patent Laying-Open No. WO02/016994, drive pins provided on the variator lens frame, the compensator lens frame and the focus lens frame are fitted into grooves of the zoom ring. When the zoom ring is rotated about the optical axis, therefore, the drive pins move along the grooves of the zoom ring, thereby moving the respective lens groups along the optical axis. Thus, the zoom lens apparatus is zoomed.

The aforementioned Japanese Patent Laying-Open No. 2-281244 discloses a projector controlling a focus lens mounted on a lens support movable along ball screws parallel to the optical axis with a remote control commander. This projector disclosed in Japanese Patent Laying-Open No. 2-281244 transmits a signal received from the remote control commander in a photoreceptor thereof to a motor driving circuit controlling rotation of a microcomputer and a stepping motor of the projector thereby controlling rotation of the stepping motor, for moving the focus lens along the optical axis following rotation of the ball screws rotatably mounted on the stepping motor.

The aforementioned Japanese Patent Publication No. 51-30460 discloses a microfilm reader capable of adjusting the enlargement ratio of an image of a microfilm projected on a screen by moving a movable reflecting surface for reflecting the image projected from a lens for projecting the image on the screen along the optical axis with a motor thereby varying the distance between the lens and the movable reflecting surface. In this microfilm reader disclosed in Japanese Patent Publication No. 51-30460, the movable reflecting surface moves along the optical axis so that a cam surface mounted on the movable reflecting surface provides rotational motion to a cam follower mounted on a rotating member having a rotation axis parallel to the optical axis, thereby rotating a lens positioning cam having a plurality of cam grooves provided at prescribed intervals with the rotating member. Racks engaged with the cam grooves move along the cam grooves for displacing the position of the lens fixed to the racks, thereby regularly keeping a focusing state in response to the enlargement ratio of the image.

FIG. 16 is a perspective view showing the overall structure of a conventional projector 100. As shown in FIG. 16, the conventional projector 100 comprises a housing 101, a lens 102 for projecting a projected image, a cylindrical frame 103, a lens position control ring 104 rotatably mounted on the outer side of the cylindrical frame 103 coaxially with the optical axis and leg members 105 mounted on the bottom surface of the housing 101.

The lens 102 is arranged in the cylindrical frame 103 movably along the optical axis (direction A in FIG. 16). The lens position control ring 104 has a function of moving the lens 102 arranged in the cylindrical frame 103 along the optical axis (direction A in FIG. 16). Thus, the position of the lens 102 supported in the cylindrical frame 103 is controlled by rotating the lens position control ring 104 in a direction B shown in FIG. 16 in focus control or zoom control. The projected image is zoom-controlled or focus-controlled in this manner.

On the other hand, a liquid crystal projector capable of horizontally and elevationally controlling a projected image projected on a screen by adjusting the height of leg members mounted on the bottom surface is known in general, as disclosed in Japanese Patent Laying-Open No. 2000-241875, for example. In the liquid crystal projector disclosed in the aforementioned Japanese Patent Laying-Open No. 2000-241875, inclination of the liquid crystal projector is changed by rotating a rotating knob mounted on a side surface of the liquid crystal projector thereby vertically expanding/contracting telescopic legs mounted on the bottom surface of the liquid crystal projector.

In the conventional projector 100 shown in FIG. 16, however, an operator must manually rotate the lens position control ring 104 arranged coaxially with the optical axis in focus control or zoom control, to disadvantageously project a shadow of his/her hand on the projected image. Consequently, it is disadvantageously difficult to focus-control and zoom-control the projected image.

In the zoom lens apparatus disclosed in the aforementioned International Patent Laying-Open No. WO02/016994, an operator must manually rotate the zoom ring arranged coaxially with the optical axis in zoom control, to disadvantageously project a shadow of his/her hand on a projected image. Consequently, it is disadvantageously difficult to zoom-control the projected image.

The projector disclosed in the aforementioned Japanese Patent Laying-Open No. 2-281244 must be provided with the stepping motor serving as a drive source and the motor driving circuit for controlling the stepping motor, and hence a mechanism for moving the focus lens is disadvantageously complicated. Consequently, a mechanism for focus-controlling and zoom-controlling the projected image is disadvantageously complicated.

The microfilm reader disclosed in the aforementioned Japanese Patent Publication No. 51-30460 must be provided with the motor serving as a drive source for moving the movable reflecting surface and the lens, and hence a mechanism for moving the lens is disadvantageously complicated. Consequently, a mechanism for focus-controlling and zoom-controlling the projected image is disadvantageously complicated.

In the liquid crystal projector disclosed in the aforementioned Japanese Patent Laying-Open No. 2000-241875, an operator must manually rotate a lens position control ring (zoom ring or the like) arranged coaxially with the optical axis in focus control or zoom control similarly to the projector 100 shown in FIG. 16 in general, to disadvantageously project a shadow of his/her hand on the projected image, although this is not described. Consequently, it is disadvantageously difficult to focus-control and zoom-control the projected image.

SUMMARY OF THE INVENTION

The present invention has been proposed in order to solve the aforementioned problems, and an object of the present invention is to provide a lens drive allowing easy focus control and zoom control with a simple structure requiring no drive source and a projector comprising this lens drive.

In order to attain the aforementioned object, a lens drive according to a first aspect of the present invention, which is a lens drive for moving a lens arranged in a housing, comprises a rotating knob located out of the optical axis of the lens with a rotation axis unparallel to the optical axis of the lens and arranged outside the housing, a knob-side cam pin provided on the rotating knob, a lens-side cam pin provided to integrally move with the lens and a cam plate arranged in the housing and formed with a knob-side cam groove receiving the knob-side cam pin and a lens-side cam groove receiving the lens-side cam pin, and the rotating knob is so rotated as to move the cam plate for moving the lens along the optical axis of the lens following this movement of the cam plate.

As hereinabove described, the lens drive according to the first aspect is provided with the rotating knob located out of the optical axis of the lens with the rotation axis unparallel to the optical axis of the lens so that an operator projects no shadow of his/her hand on a projected image when rotating the rotating knob for moving the lens along the optical axis in focus control or zoom control, whereby the overall projected image can be projected on a screen. Consequently, the operator can rotate the rotating knob while confirming the projected image, thereby easily performing focus control and zoom control. Further, the operator can move the lens along the optical axis without a drive source such as a motor by rotating the rotating knob thereby moving the cam plate for moving the lens along the optical axis of the lens following this movement of the cam plate. Consequently, the operator can perform focus control and zoom control with a simple structure without employing a drive source such as a motor.

In the aforementioned lens drive according to the first aspect, the rotation axis of the rotating knob is preferably arranged substantially perpendicularly to the optical axis of the lens. According to this structure, the operator can easily perform focus control and zoom control while confirming the projected image by rotating the rotating knob having the rotation axis substantially perpendicular to the optical axis of the lens.

In the aforementioned lens drive according to the first aspect, the lens preferably includes a first lens and a second lens, the rotating knob preferably has a first rotating knob and a second rotating knob, the knob-side cam pin preferably includes a first knob-side cam pin provided on the first rotating knob and a second knob-side cam pin provided on the second rotating knob, the lens-side cam pin preferably includes a first lens-side cam pin provided to integrally move with the first lens and a second lens-side cam pin provided to integrally move with the second lens, the cam plate preferably includes a first cam plate provided with a first knob-side cam groove receiving the first knob-side cam pin and a first lens-side cam groove receiving the first lens-side cam pin and a second cam plate provided with a second knob-side cam groove receiving the second knob-side cam pin and a second lens-side cam groove receiving the second lens-side cam pin, the first rotating knob is preferably so rotated as to move the first cam plate for moving the first lens along the optical axis of the first lens following this movement of the first cam plate, and the second rotating knob is preferably so rotated as to move the second cam plate for moving the second lens along the optical axis of the second lens following this movement of the second cam plate. According to this structure, the first and second lenses can be independently moved. Consequently, the projected image can be zoom-controlled and focus-controlled by moving the first lens and thereafter moving the second lens when the first lens is constituted of a zoom lens moved in zoom control and the second lens is constituted of a focus lens moved in focus control.

In this case, the cam plate preferably further includes a coupling cam plate for interlocking the first cam plate and the second cam plate, and the coupling cam plate interlocking with the first cam plate preferably so moves as to move the second cam plate for moving the second lens along the optical axis of the second lens following this movement of the second cam plate. According to this structure, the operator can move the first lens as well as the second lens by rotating the first rotating knob. Consequently, the operator can easily zoom-control the projected image by moving both of the first and second lenses thereby changing the distance between the first and second lenses.

In the aforementioned lens drive comprising the first cam plate, the first lens-side cam groove of the first cam plate receiving the first lens-side cam pin is preferably curvedly formed. According to this structure, the movement of the first lens can be varied with the movement of the first cam plate responsive to a prescribed quantity of rotation of the first rotating knob. Thus, the first lens can be so moved as to zoom (enlarge) the projected image proportionately to the quantity of rotation of the first rotating knob also when zooming (enlarging) the projected image unproportionately to the distance between the first and second lenses. Consequently, zoom control can be performed with a simple structure dissimilarly to a case of varying the movement of the first lens with a rack and a pinion or a reduction gear.

In the aforementioned lens drive comprising the first and second rotating knobs, the first rotating knob is preferably discoidally formed, the second rotating knob is preferably annularly formed to enclose the outer periphery of the discoidal first rotating knob, and the first rotating knob and the second rotating knob are preferably independently rotatably arranged outside the housing respectively. According to this structure, the first and second lenses can be independently moved in zoom control and focus control respectively when the first and second rotating knobs serve as knobs for zoom control and focus control respectively, for example.

In the aforementioned lens drive comprising the coupling cam plate, the coupling cam plate is preferably provided with a first coupling cam pin while the second cam plate is preferably provided with a second coupling cam pin, and the first cam plate is preferably provided with a first coupling cam groove receiving the first coupling cam pin of the coupling cam plate while the coupling cam plate is preferably provided with a second coupling cam groove receiving the second coupling cam pin of the second cam plate. According to this structure, the first cam plate as well as the coupling cam plate provided with the first coupling cam pin inserted into the first coupling cam groove of the first cam plate can be moved by rotating the first rotating knob. Further, the second cam plate provided with the second coupling cam pin inserted into the second coupling cam groove of the coupling cam plate can be moved through this movement of the coupling cam plate. Consequently, the first and second lenses moved following the first and second cam plates respectively can be easily simultaneously moved by rotating the first rotating knob.

The aforementioned lens drive comprising the first and second lens-side cam pins preferably further comprises a frame including a slot formed to extend along the optical axis for receiving the first lens-side cam pin and the second lens-side cam pin movably along the optical axis. According to this structure, the first and second lens-side cam pins moved following movement of the first and second cam plates respectively can be moved along the slot of the frame. Consequently, the first and second lenses can be easily moved along the optical axis following the movement of the first and second cam plates.

In the aforementioned lens drive comprising the coupling cam plate including the second coupling cam groove, the second cam plate is preferably movable at least along a direction intersecting with the direction of the optical axis, and the second coupling cam groove of the coupling cam plate is preferably formed to extend in the direction intersecting with the direction of the optical axis. According to this structure, the second coupling cam pin of the second cam plate can be moved along the second coupling cam groove extending in the direction intersecting with the optical axis of the coupling cam plate when the second cam plate moves in the direction intersecting with the optical axis following rotation of the second rotating knob. In other words, the coupling cam plate remains unmoved when the second rotating knob is so rotated as to move the second cam plate, whereby only the second lens interlocked with the second cam plate can be moved. Consequently, movement of the second lens can be finely controlled by finely controlling the second rotating knob when the second lens is a focus lens, for example, whereby focus control can be easily performed.

A projector comprising a lens drive according to a second aspect of the present invention, which is a projector comprising a lens drive for moving a lens arranged in a housing, includes a rotating knob located out of the optical axis of the lens with a rotation axis unparallel to the optical axis of the lens and arranged outside the housing, a knob-side cam pin provided on the rotating knob, a lens-side cam pin provided to integrally move with the lens and a cam plate arranged in the housing and formed with a knob-side cam groove receiving the knob-side cam pin and a lens-side cam groove receiving the lens-side cam pin, and the rotating knob is so rotated as to move the cam plate for moving the lens along the optical axis of the lens following this movement of the cam plate.

As hereinabove described, the projector comprising a lens drive according to the second aspect is provided with the rotating knob located out of the optical axis of the lens with the rotation axis unparallel to the optical axis of the lens so that an operator projects no shadow of his/her hand on a projected image when rotating the rotating knob for moving the lens along the optical axis in focus control or zoom control, whereby the overall projected image can be projected on a screen. Consequently, the operator can rotate the rotating knob while confirming the projected image, thereby easily performing focus control and zoom control. Further, the operator can move the lens along the optical axis without a drive source such as a motor by rotating the rotating knob thereby moving the cam plate for moving the lens along the optical axis of the lens following this movement of the cam plate. Consequently, the operator can perform focus control and zoom control with a simple structure without employing a drive source such as a motor.

A projector comprising a lens drive according to a third aspect of the present invention comprises a first lens and a second lens arranged in a housing, a first lens support member for supporting the first lens and a second lens support member for supporting the second lens, a first rotating knob and a second rotating knob located out of the optical axis of the first lens and the second lens and arranged on the upper surface of the housing with a rotation axis unparallel to the optical axis of the first lens and the second lens, a first cam plate and a second cam plate arranged in the housing and a coupling cam plate for interlocking the first cam plate and the second cam plate, the first rotating knob is provided with a first knob-side cam pin while the second rotating knob is provided with a second knob-side cam pin, the first lens support member is provided with a first lens-side cam pin while the second lens support member is provided with a second lens-side cam pin, the first cam plate includes a first knob-side cam groove receiving the first knob-side cam pin and a first lens-side cam groove receiving the first lens-side cam pin while the second cam plate includes a second knob-side cam groove receiving the second knob-side cam pin and a second lens-side cam groove receiving the second lens-side cam pin, the coupling cam plate is provided with a first coupling cam pin while the second cam plate is provided with a second coupling cam pin, the first cam plate is provided with a first coupling cam groove receiving the first coupling cam pin of the coupling cam plate while the coupling cam plate is provided with a second coupling cam groove receiving the second coupling cam pin of the second cam plate, the first lens-side cam groove of the first cam plate receiving the first lens-side cam pin is curvedly formed, the first rotating knob is so rotated as to move the first cam plate for moving the first lens along the optical axis of the first lens following this movement of the first cam plate and moving the coupling cam plate interlocking with the first cam plate thereby moving the second cam plate for moving the second lens along the optical axis of the second lens following this movement of the second cam plate in zoom control, and the second rotating knob is so rotated as to move the second cam plate for moving the second lens along the optical axis of the second lens following this movement of the second cam plate in focus control.

As hereinabove described, the projector comprising a lens drive according to the third aspect is provided with the first and second rotating knobs located out of the optical axis of the first and second lenses and arranged on the upper surface of the housing with the rotation axis unparallel to the optical axis of the first and second lenses so that an operator projects no shadow of his/her hand on a projected image when rotating the first and second rotating knobs arranged on the upper surface of the housing for moving the first and second lenses along the optical axis in focus control or zoom control, whereby the overall projected image can be projected on a screen. Consequently, the operator can rotate the first and second rotating knobs while confirming the projected image, thereby easily performing focus control and zoom control. Further, the operator can move the first lens along the optical axis without a drive source such as a motor in zoom control by rotating the first rotating knob thereby moving the first cam plate for moving the first lens along the optical axis of the first lens following this movement of the first cam plate. In addition, the operator can move the second lens along the optical axis without a drive source such as a motor in focus control by rotating the second rotating knob thereby moving the second cam plate for moving the second lens along the optical axis of the second lens following this movement of the second cam plate. Consequently, the operator can perform focus control and zoom control with a simple structure without employing a drive source such as a motor. Further, the coupling cam plate for interlocking the first and second cam plates is so provided that the operator can move the first lens as well as the second lens by rotating the first rotating knob. Consequently, the operator can easily zoom-control the projected image by moving both of the first and second lenses thereby changing the distance between the first and second lenses. In addition, the coupling cam plate is provided with the first coupling cam pin and the second cam plate is provided with the second coupling cam pin while the first cam plate is provided with the first coupling cam groove receiving the first coupling cam pin of the coupling cam plate and the coupling cam plate is provided with the second coupling cam groove receiving the second coupling cam pin of the second cam plate so that the first cam plate as well as the coupling cam plate provided with the first coupling cam pin inserted into the first coupling cam groove of the first cam plate can be moved by rotating the first rotating knob. Further, the second cam plate provided with the second coupling cam pin inserted into the second coupling cam groove of the coupling cam plate can be moved following the movement of the coupling cam plate. Consequently, the first and second lenses moved following the first and second cam plates respectively can be easily simultaneously moved by rotating the first rotating knob. Further, the first lens-side cam groove of the first cam plate receiving the first lens-side cam pin is so curvedly formed that the movement of the first lens can be varied with the movement of the first cam plate responsive to a prescribed quantity of rotation of the first rotating knob. Thus, the first lens can be so moved as to zoom (enlarge) the projected image proportionately to the quantity of rotation of the first rotating knob also when zooming (enlarging) the projected image unproportionately to the distance between the first and second lenses. Consequently, zoom control can be performed with a simple structure dissimilarly to a case of varying the movement of the first lens with a rack and a pinion or a reduction gear.

In the aforementioned projector comprising a lens drive according to the third aspect, the rotation axis of the first rotating knob and the second rotating knob is preferably arranged substantially perpendicularly to the optical axis of the first lens and the second lens. According to this structure, the operator can easily perform focus control and zoom control while confirming the projected image by rotating the rotating knobs having the rotation axis substantially perpendicular to the optical axis of the lenses.

In the aforementioned projector comprising a lens drive according to the third aspect, the first rotating knob is preferably discoidally formed, the second rotating knob is preferably annularly formed to enclose the outer periphery of the discoidal first rotating knob, and the first rotating knob and the second rotating knob are preferably independently rotatably arranged outside the housing respectively. According to this structure, the first and second lenses can be independently moved in zoom control and focus control when the first and second rotating knobs serve as knobs for zoom control and focus control respectively, for example.

The aforementioned projector comprising a lens drive according to the third aspect preferably further comprises a frame for movably arranging the first lens support member and said second lens support member, and the frame preferably includes a slot formed to extend along the optical axis for receiving the first lens-side cam pin of the first lens support member and the second lens-side cam pin of the second lens support member. According to this structure, the first and second lens-side cam pins moved following movement of the first and second cam plates respectively can be moved along the slot of the frame. Consequently, the first and second lenses can be easily moved along the optical axis following the movement of the first and second cam plates.

In the aforementioned projector comprising a lens drive according to the third aspect, the second cam plate is preferably movable at least along a direction intersecting with the direction of the optical axis, and the second coupling cam groove of the coupling cam plate is preferably formed to extend in the direction intersecting with the direction of the optical axis. According to this structure, the second coupling cam pin of the second cam plate can be moved along the second coupling cam groove extending in the direction intersecting with the optical axis of the coupling cam plate when the second cam plate moves in the direction intersecting with the optical axis following rotation of the second rotating knob. In other words, the coupling cam plate remains unmoved when the second rotating knob is so rotated as to move the second cam plate, whereby only the second lens interlocked with the second cam plate can be moved. Consequently, movement of the second lens can be finely controlled by finely controlling the second rotating knob when the second lens is a focus lens, for example, whereby focus control can be easily performed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
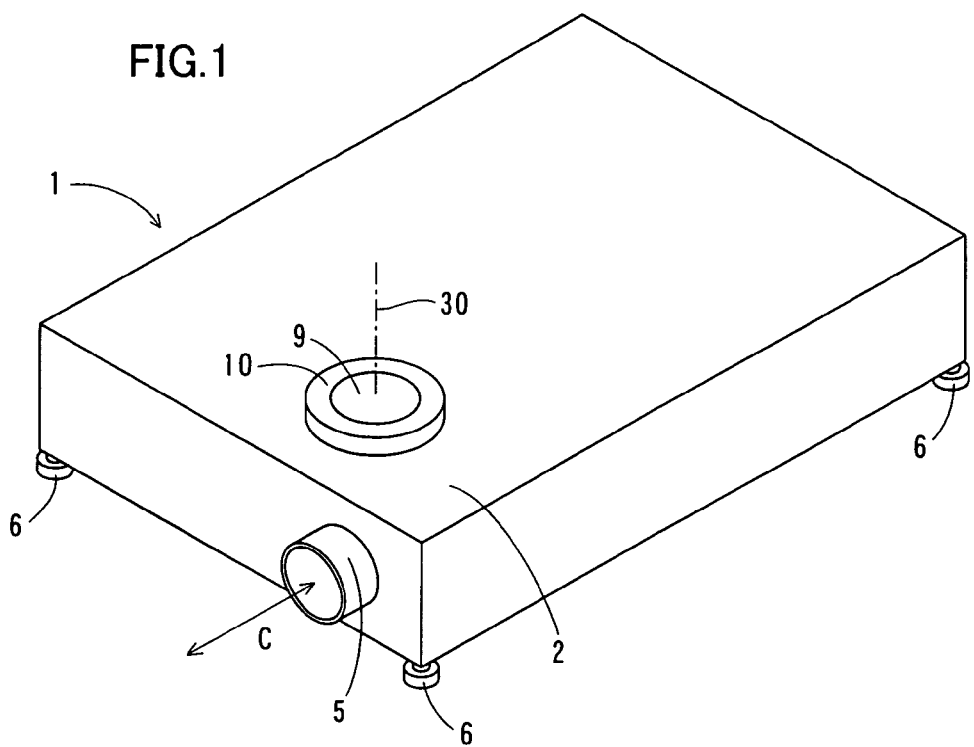
FIG. 1 is a perspective view showing the overall structure of a projector according to a first embodiment of the present invention.

Embodiments of the present invention are now described with reference to the drawings.

First Embodiment

The structure of a projector 1 according to a first embodiment of the present invention is described with reference to FIGS. 1 to 7. In the first embodiment, a lens drive 20 according to the present invention is applied to the projector 1.

The projector 1 according to the first embodiment of the present invention comprises a housing 2, a zoom lens 3 for zoom control, a focus lens 4 for zoom control and focus control, a cylindrical frame 5, leg members 6 (see FIG. 1) mounted on the bottom surface of the housing 2, a zoom lens support member 7 (see FIG. 3) for supporting the zoom lens 3 and a focus lens support member 8 (see FIG. 3) for supporting the focus lens 4. The zoom lens 3 is an example of the "first lens" in the present invention, and the focus lens 4 is an example of the "second lens" in the present invention. The zoom lens support member 7 is an example of the "first lens support member" in the present invention, and the focus lens support member 8 is an example of the "second lens support member" in the present invention.

Figure 4:
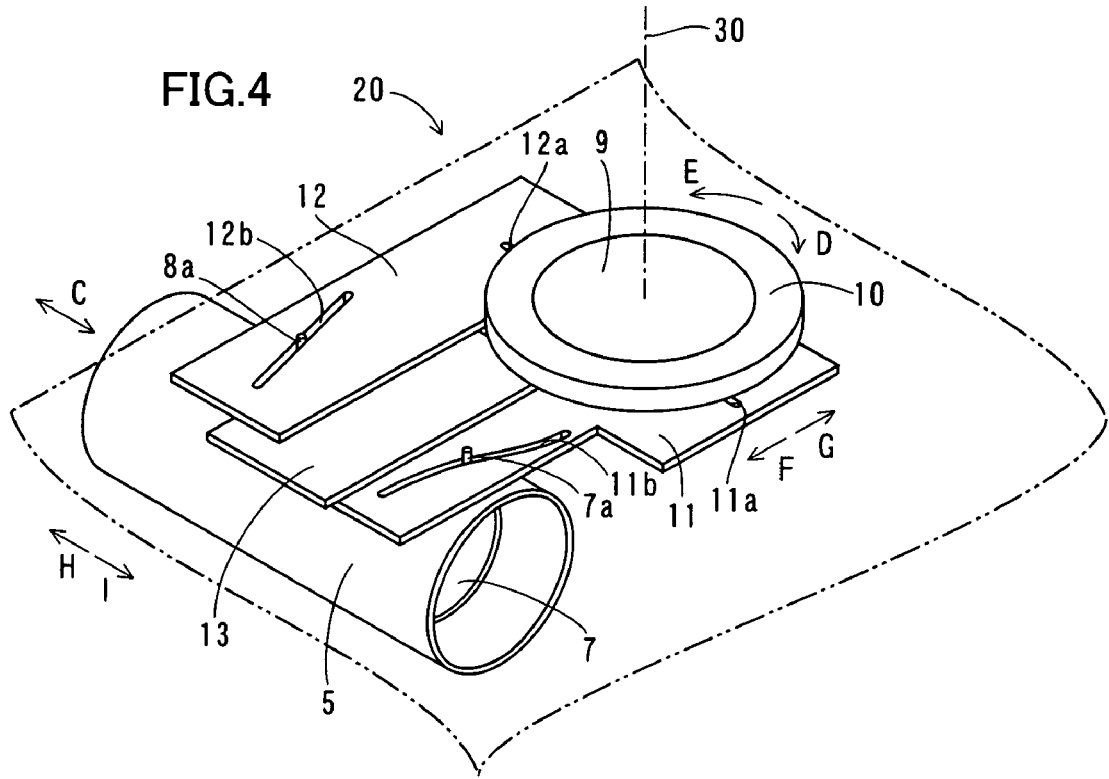
FIG. 4 is a perspective view of the projector according to the first embodiment of the present invention shown in FIG. 1.

According to the first embodiment, the projector 1 comprises a zooming knob 9 and a focusing knob 10 located out of the optical axis of the zoom lens 3 and the focus lens 4 with a rotation axis 30 unparallel to the optical axis of the zoom lens 3 and the focus lens 4. More specifically, the rotation axis 30 of the zooming knob 9 and the focusing knob 10 is arranged substantially perpendicularly to the optical axis of the zoom lens 3 and the focus lens 4. The zooming knob 9 and the focusing knob 10 are arranged on the upper surface of the housing 2. The zooming knob 9 is discoidally formed. The focusing knob 10 is annularly formed to enclose the outer periphery of the zooming knob 9. The zooming knob 9 is an example of the "first rotating knob" in the present invention, and the focusing knob 10 is an example of the "second rotating knob" in the present invention. A zoom cam plate 11, a focus cam plate 12 and a coupling cam plate 13 for interlocking the zoom cam plate 11 and the focus cam plate 12 are arranged in the housing 2, as shown in FIG. 4. The zoom cam plate 11 is an example of the "first cam plate" in the present invention, and the focus cam plate 12 is an example of the "second cam plate" in the present invention. According to the first embodiment, the cylindrical frame 5, the zoom lens support member 7, the focus lens support member 8, the zooming knob 9, the focusing knob 10, the zoom cam plate 11, the focus cam plate 12 and the coupling cam plate 13 constitute the lens drive 20.

Figure 3:
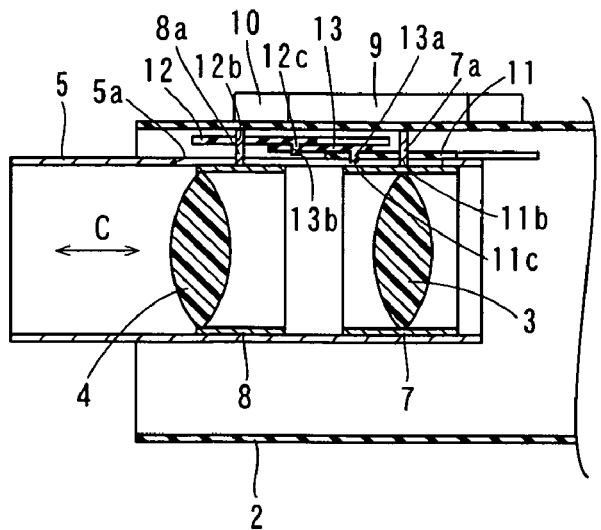
FIG. 3 is a sectional view taken along the line 200-200 in FIG. 2.

As shown in FIG. 3, the cylindrical zoom lens support member 7 for supporting the zoom lens 3 and the cylindrical focus lens support member 8 for supporting the focus lens 4 are arranged in the cylindrical frame 5 movably along the optical axis (direction C in FIG. 3). A slot 5a is formed on the upper side of the cylindrical frame 5 to extend along the optical axis (direction C in FIGS. 3 and 5), as shown in FIGS. 3 and 5.

According to the first embodiment, cam pins 7a and 8a are provided on the upper portions of the zoom lens support member 7 and the focus lens support member 8 respectively, as shown in FIG. 3. These cam pins 7a and 8a are so provided as to protrude upward from the slot 5a of the cylindrical frame 5. The cam pin 7a is an example of the "first lens-side cam pin" in the present invention, and the cam pin 8a is an example of the "second lens-side cam pin" in the present invention.

Figure 6:
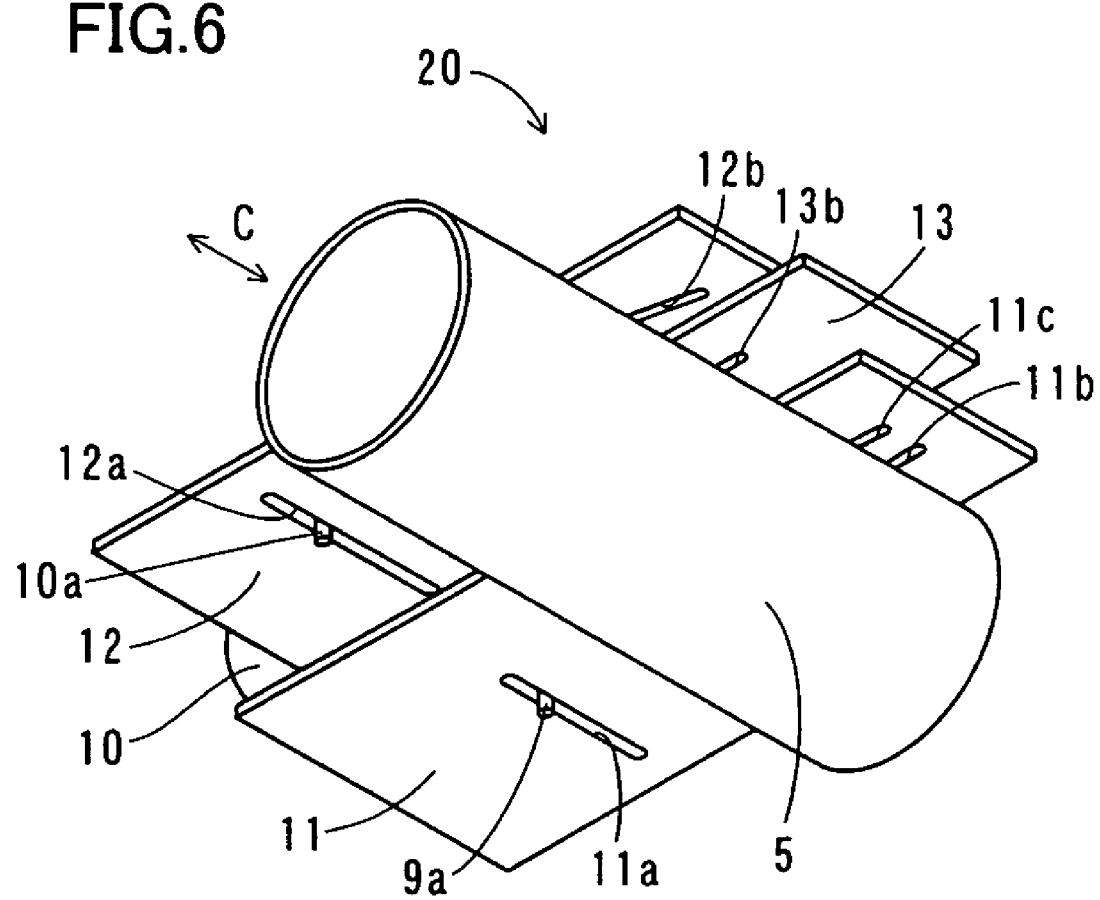
FIG. 6 is another perspective view of the projector according to the first embodiment of the present invention shown in FIG. 1.
Figure 7:
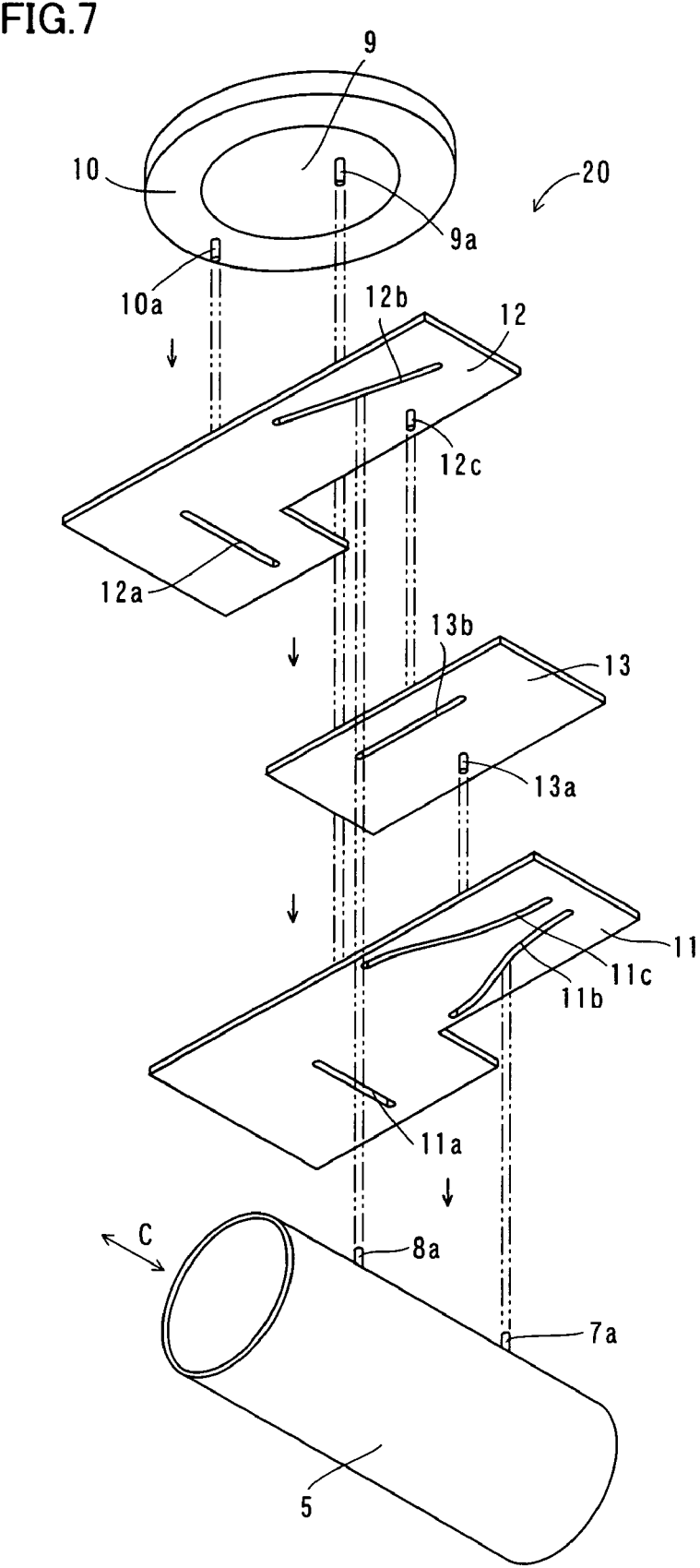
FIG. 7 is another exploded perspective view of the projector according to the first embodiment of the present invention shown in FIG. 1.

According to the first embodiment, further, cam pins 9a and 10a are provided on the lower surfaces of the zooming knob 9 and the focusing knob 10 respectively, as shown in FIGS. 6 and 7. The cam pin 9a is an example of the "first knob-side cam pin" in the present invention, and the cam pin 10a is an example of the "second knob-side cam pin" in the present invention. The zooming knob 9 and the focusing knob 10 are rotatable about the rotation axis 30 (see FIG. 4) along arrows D and E in FIG. 4 respectively. Further, the zooming knob 9 and the focusing knob 10 are mounted on the upper surface of the housing 2 to rotate independently of each other.

Figure 5:
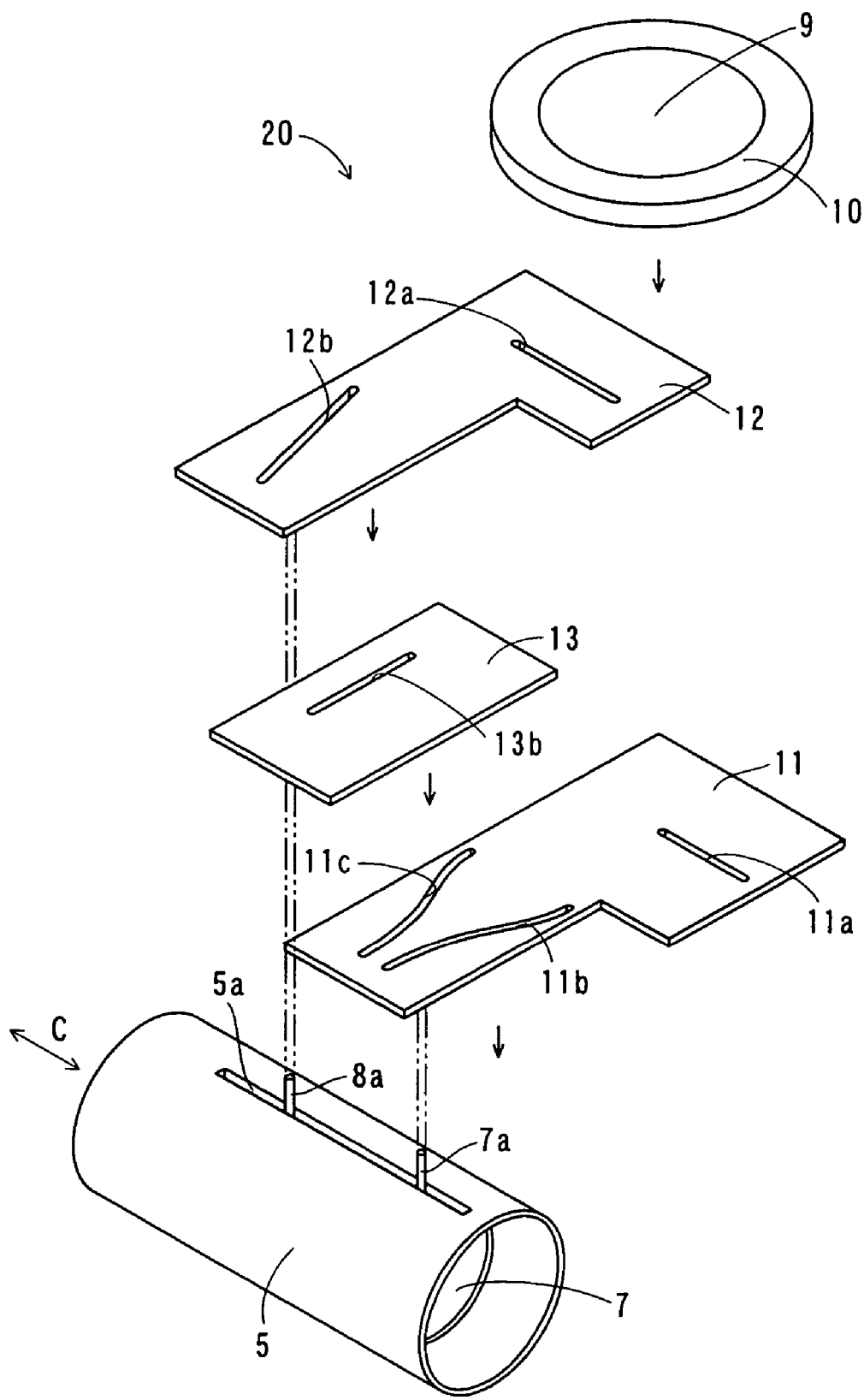
FIG. 5 is an exploded perspective view of the projector according to the first embodiment of the present invention shown in FIG. 1.

According to the first embodiment, the zoom cam plate 11 is formed with a cam groove 11a receiving the cam pin 9a of the zooming knob 9, as shown in FIGS. 5 and 7. This cam groove 11a is linearly formed to extend along the optical axis (direction C in FIGS. 5 and 7). The zoom cam plate 11 is also formed with a cam groove 11b receiving the cam pin 7a of the zoom lens support member 7. The zoom cam plate 11 is further formed with a cam groove 11c receiving a cam pin 13a of the coupling cam plate 13 described later. The cam grooves 11b and 11c are curvedly formed. The zoom cam plate 11 is regulated to move along arrows F and G in FIG. 2. The cam groove 11a is an example of the "first knob-side cam groove" in the present invention, the cam groove 11b is an example of the "first lens-side cam groove" in the present invention, and the cam groove 11c is an example of the "first coupling cam groove" in the present invention.

According to the first embodiment, the focus cam plate 12 is formed with a cam groove 12a receiving the cam pin 10a of the focusing knob 10. This cam groove 12a is linearly formed to extend along the optical axis (direction C in FIGS. 5 and 7). The focus cam plate 12 is also formed with a cam groove 12b receiving the cam pin 8a of the focus lens support member 8. This cam groove 12b is linearly formed to incline by a prescribed angle with respect to the optical axis (direction C in FIGS. 5 and 7). The focus plate 12 is further formed on its lower surface with a cam pin 12c inserted into a cam groove 13b of the coupling cam plate 13 described later. The focus cam plate 12 is regulated to move along arrows F and G in FIG. 2 and arrows H and I in FIG. 2. The cam groove 12a is an example of the "second knob-side cam groove" in the present invention, the cam groove 12b is an example of the "second lens-side cam groove" in the present invention, and the cam pin 12c is an example of the "second coupling cam pin" in the present invention.

According to the first embodiment, the coupling cam plate 13 arranged between the zoom cam plate 11 and the focus cam plate 12 is provided with the cam pin 13a inserted into the cam groove 11c of the zoom cam plate 11, as shown in FIG. 7. The coupling cam plate 13 is also provided with the cam groove 13b receiving the cam pin 12c of the focus cam plate 12. This cam groove 13b is linearly formed perpendicularly to the optical axis (direction C in FIG. 7). The coupling cam plate 13 is regulated to move along arrows H and I in FIG. 2. The cam pin 13a is an example of the "first coupling cam pin" in the present invention, and the cam groove 13b is an example of the "second coupling cam groove" in the present invention.

Figure 2:
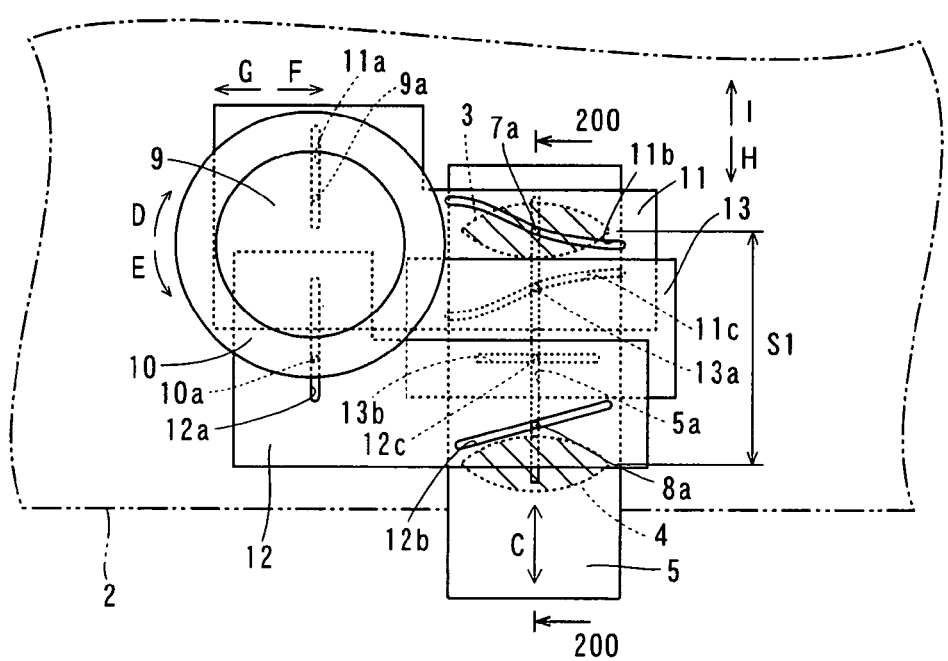
FIG. 2 is a plan view of the projector according to the first embodiment of the present invention shown in FIG. 1.

Zoom control and focus control methods in the projector 1 are now described with reference to FIGS. 2, 8 and 9.

First, zoom control is performed by varying the distance S1 (see FIG. 2) between the zoom lens 3 and the focus lens 4. In zoom control, the zooming knob 9 is rotated along arrow D in FIG. 2 from the state shown in FIG. 2, thereby also rotating the cam pin 9a of the zooming knob 9 along arrow D in FIG. 2. Therefore, the zoom cam plate 11 formed with the cam groove 11a receiving the cam pin 9a of the zooming knob 9 moves along arrow F in FIG. 2. The zoom lens 3 fixed to the zoom lens support member 7 provided with the cam pin 7a inserted into the cam groove 11b of the zoom cam plate 11 moves along arrow I in FIG. 2, guided along the cam groove 11b of the zoom cam plate 11. At this time, the coupling cam plate 13 provided with the cam pin 13a inserted into the cam groove 11c of the zoom cam plate 11 moves along arrow H in FIG. 2, guided along the cam groove 11c of the zoom cam plate 11. Thus, the focus cam plate 12 provided with the cam pin 12c inserted into the cam groove 13b of the coupling cam plate 13 moves along arrow H in FIG. 2, to interlock with the coupling cam plate 13. Consequently, the focus lens 4 fixed to the focus lens support member 8 provided with the cam pin 8a inserted into the cam groove 12b of the focus cam plate 12 moves along arrow I in FIG. 2, guided along the cam groove 12b. Thus, the zoom lens 3 and the focus lens 4 are arranged at a distance S2 as shown in FIG. 8, for completing zoom control.

Figure 8:
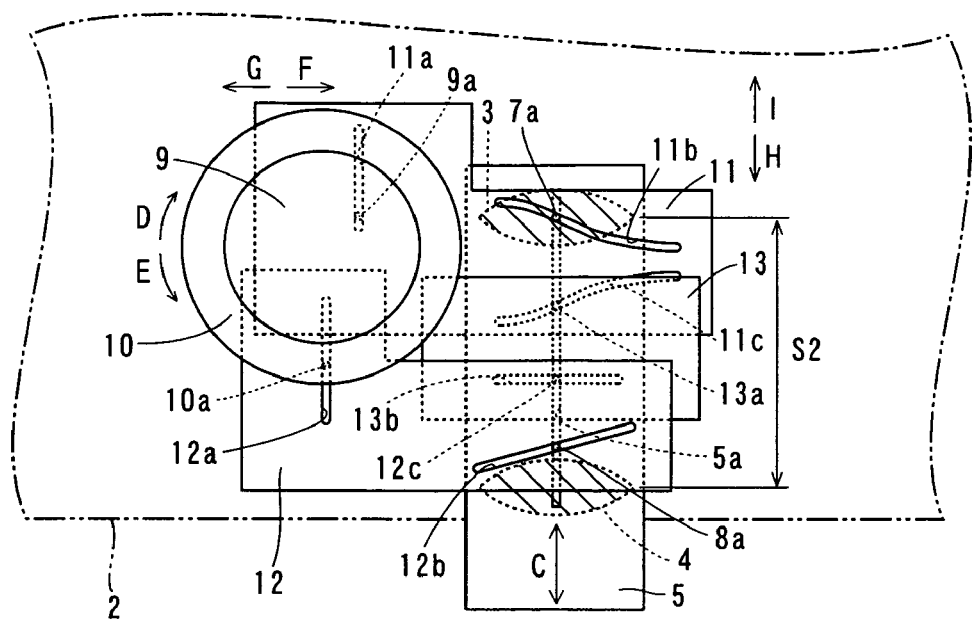
FIGS. 8 and 9 are plan views for illustrating zoom control and focus control methods in the projector according to the first embodiment of the present invention shown in FIG. 1.
Figure 9:
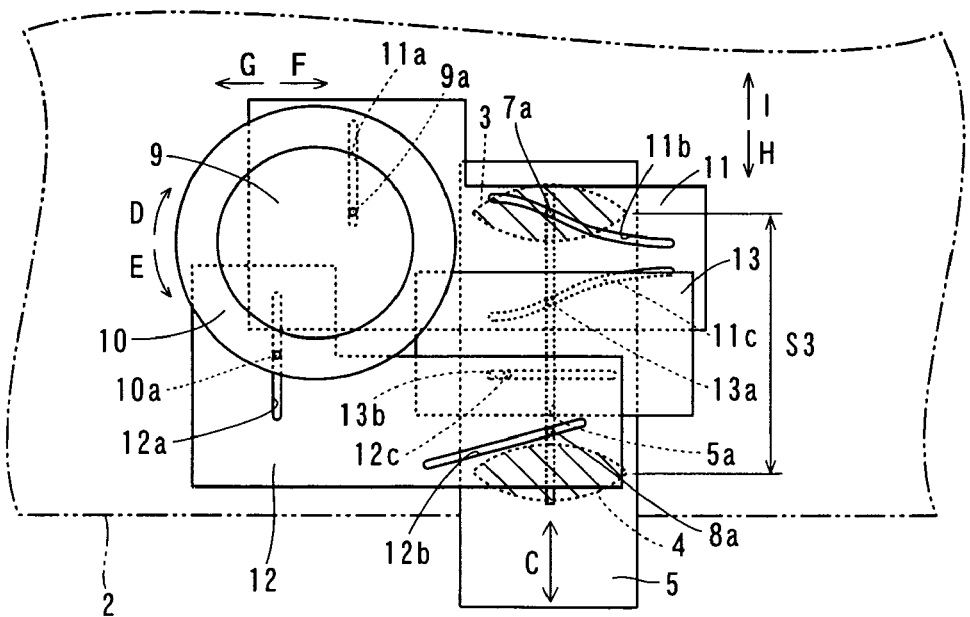

Then, focus control is performed by moving the focus lens 4 along the optical axis (direction C in FIG. 8). In focus control, the focusing knob 10 is rotated along arrow D in FIG. 8 from the state shown in FIG. 8, thereby rotating the cam pin 10a of the focusing knob 10 along arrow D in FIG. 8. Thus, the focus cam plate 12 formed with the cam groove 12a receiving the cam pin 10a of the focusing knob 10 moves along arrow G in FIG. 8. The focus lens 4 fixed to the focus lens support member 8 provided with the cam pin 8a inserted into the cam groove 12b of the focus cam plate 12 moves along arrow I in FIG. 8, guided along the cam groove 12b of the focus cam plate 12. Consequently, the zoom lens 3 and the focus lens 4 are arranged at a distance S3 as shown in FIG. 9, for completing focus control.

According to the first embodiment, as hereinabove described, the zooming knob 9 and the focusing knob 10 located out of the optical axis of the zoom lens 3 and the focus lens 4 and arranged on the upper surface of the housing 2 with the rotation axis 30 unparallel to the optical axis of the zoom lens 3 and the focus lens 4 are so provided that an operator projects no shadow of his/her hand on a projected image when rotating the zooming knob 9 and the focusing knob 10 arranged on the upper surface of the housing 2 for moving the zoom lens 3 and the focus lens 3 along the optical axis (direction C in FIG. 1) in focus control or zoom control, whereby the overall projected image can be projected on a screen. Consequently, the operator can rotate the zooming knob 9 and the focusing knob 10 while confirming the projected image, thereby easily performing focus control and zoom control.

According to the first embodiment, the zoom lens 3 can be moved along the optical axis without a drive source such as a motor by rotating the zooming knob 9 thereby moving the zoom cam plate 11 for moving the zoom lens 3 along the optical axis thereof (direction C in FIG. 1) following this movement of the zoom cam plate 11. Further, the focus lens 4 can be moved along the optical axis without a drive source such as a motor by rotating the focusing knob 10 thereby moving the focus cam plate 12 for moving the focus lens 4 along the optical axis thereof (direction C in FIG. 1) following this movement of the focus cam plate 12. Consequently, zoom control and focus control can be performed with a simple structure without a drive source such as a motor.

According to the first embodiment, the coupling cam plate 13 for interlocking the zoom cam plate 11 and the focus cam plate 12 is so provided that the zoom lens 3 as well as the focus lens 4 can be moved by rotating the zooming knob 9. Consequently, the projected image can be easily zoom-controlled by rotating the zooming knob 9 when zoom-controlling the projected image by moving both of the zoom lens 3 and the focus lens 4 thereby changing the distance S1 (see FIG. 2) between the zoom lens 3 and the focus lens 4.

According to the first embodiment, the coupling cam plate 13 and the focus cam plate 12 are provided with the cam pins 13a and 12c respectively while the zoom cam plate 11 and the coupling cam plate 13 are provided with the cam grooves 11c and 13b receiving the cam pins 13a and 12c of the coupling cam plate 13 and the focus cam plate 12 respectively so that the zoom cam plate 11 as well as the coupling cam plate 13 provided with the cam pin 13a inserted into the cam groove 11c of the zoom cam plate 11 can be moved by rotating the zooming knob 9. Further, the focus cam plate 12 provided with the cam pin 12c inserted into the cam groove 13b of the coupling cam plate 13 can be moved following this movement of the coupling cam plate 13. Consequently, the zoom lens 3 and the focus lens 4 moved following the zoom cam plate 11 and the focus cam plate 12 respectively can be easily simultaneously moved by rotating the zooming knob 9.

According to the first embodiment, the cam groove 12b of the zoom cam plate 11 receiving the cam pin 7a is so curvedly formed that the movement of the zoom lens 3 can be varied with the movement of the zoom cam plate 11 responsive to a prescribed quantity of rotation of the zooming knob 9. Thus, the zoom lens 3 can be so moved as to zoom (enlarge) the projected image proportionately to the quantity of rotation of the zooming knob 9 also when zooming (enlarging) the projected image unproportionately to the distance between the zoom lens 3 and the focus lens 4. Consequently, zoom control can be performed with a simple structure dissimilarly to a case of varying the movement of the zoom lens 3 with a rack and a pinion or a reduction gear.

Second Embodiment

Referring to FIGS. 10 to 13, a projector 51 according to a second embodiment of the present invention is provided with no coupling cam plate, dissimilarly to the aforementioned first embodiment. The structure of the second embodiment other than a zoom cam plate 61 and a focus cam plate 62 is similar to that of the aforementioned first embodiment, and hence redundant description is not repeated.

Figure 10:
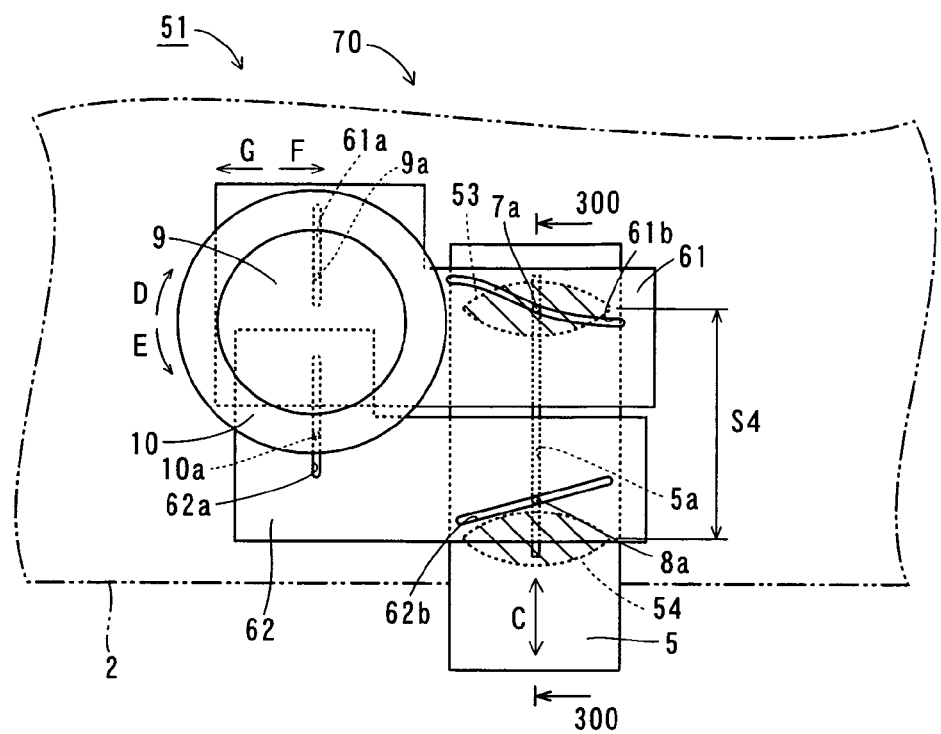
FIG. 10 is a plan view of a projector according to a second embodiment of the present invention.
Figure 11:
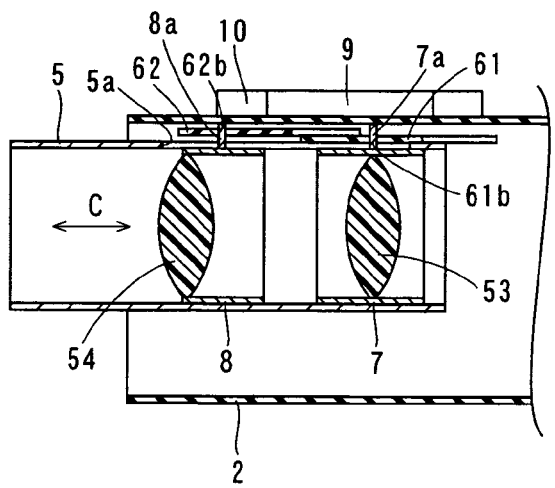
FIG. 11 is a sectional view taken along the line 300-300 in FIG. 10.

The projector 51 according to the second embodiment comprises a zoom lens 53 for zoom control and a focus lens 54 for focus control, as shown in FIGS. 10 and 11. In other words, the focus lens 54 has a function of performing only focus control according to the second embodiment, dissimilarly to the focus lens 4 for zoom control and focus control according to the first embodiment. The zoom lens 53 is an example of the "first lens" in the present invention, and the focus lens 54 is an example of the "second lens" in the present invention.

Figure 12:
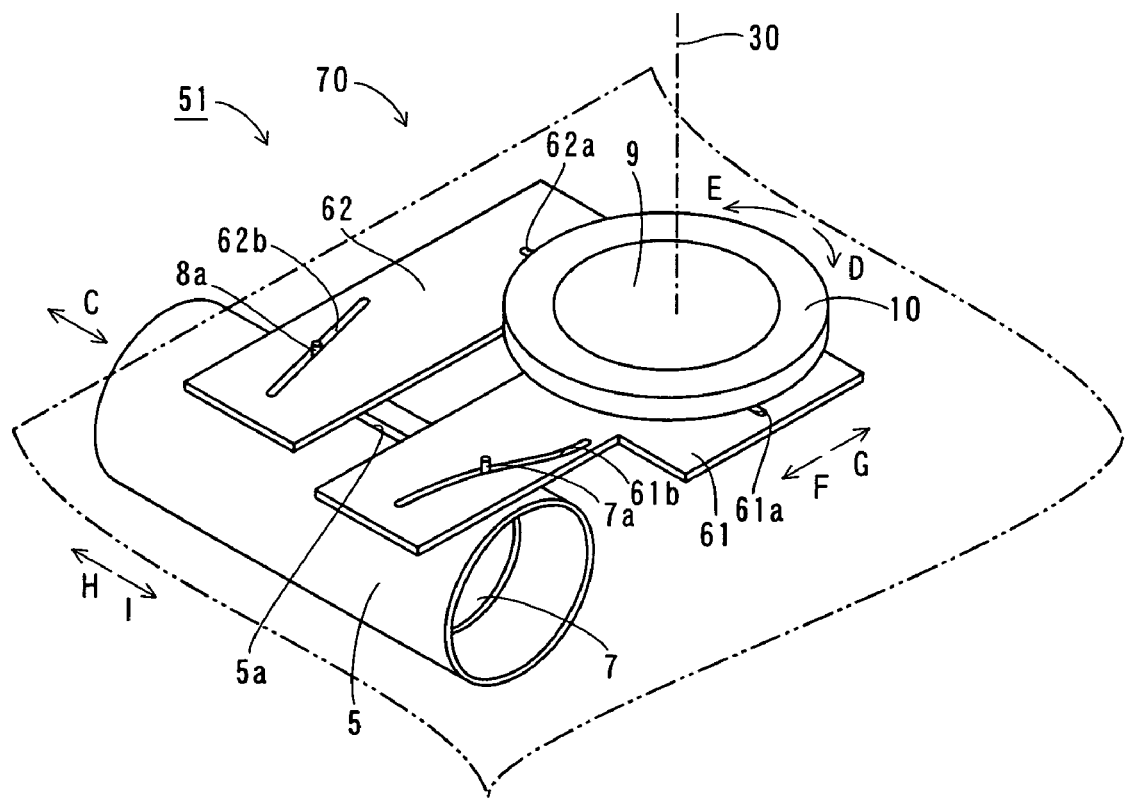
FIG. 12 is a perspective view of the projector according to the second embodiment of the present invention shown in FIG. 10.
Figure 13:
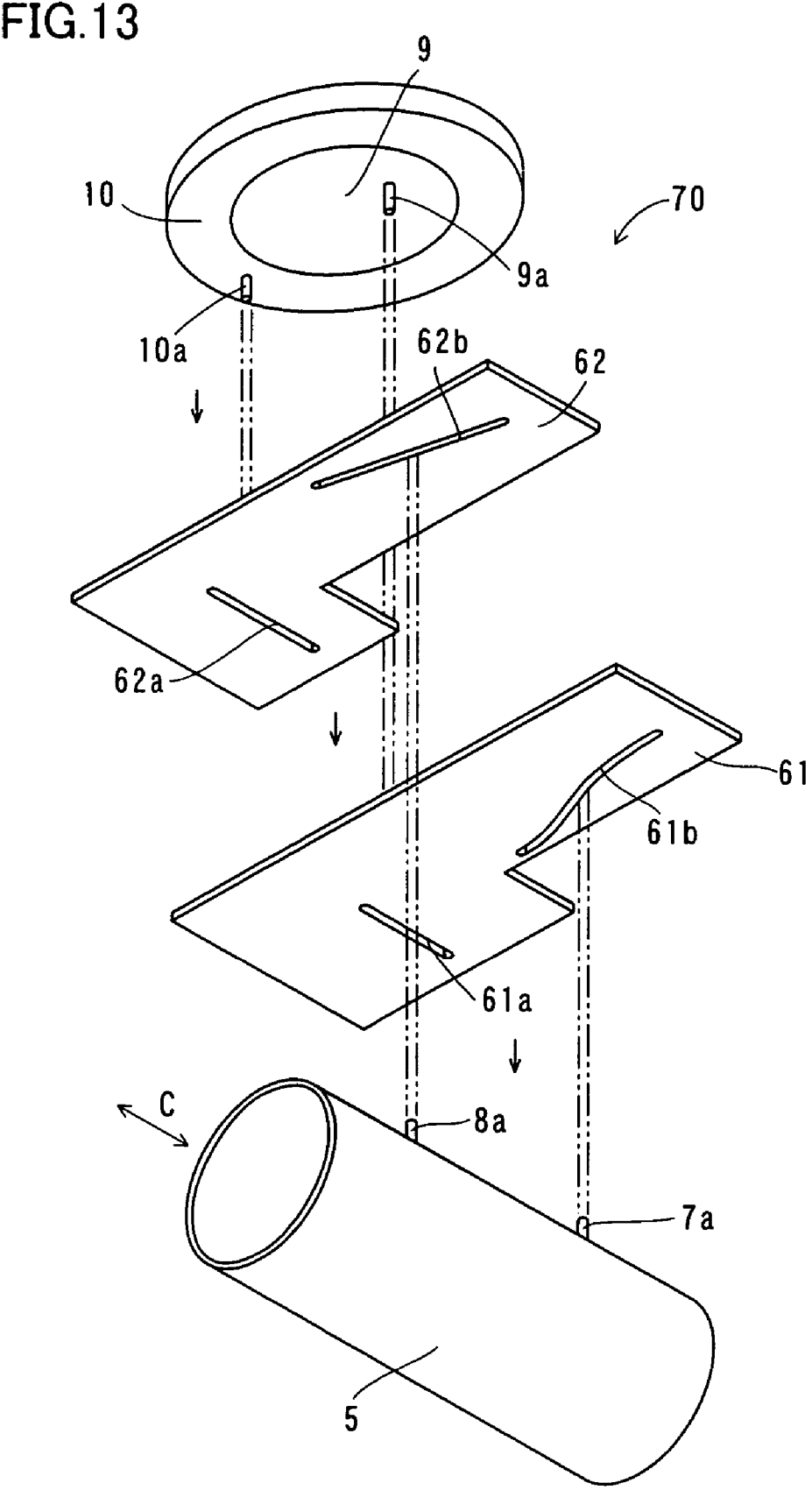
FIG. 13 is an exploded perspective view of the projector according to the second embodiment of the present invention shown in FIG. 10.

According to the second embodiment, the zoom cam plate 61 and the focus cam plate 62 are arranged in a housing 2, as shown in FIGS. 12 and 13. The zoom cam plate 61 is an example of the "first cam plate" in the present invention, and the focus cam plate 62 is an example of the "second cam plate" in the present invention. According to the second embodiment, a cylindrical frame 5, a zoom lens support member 7, a focus lens support member 8, a zooming knob 9, a focusing knob 10, the zoom cam plate 61 and the focus cam plate 62 constitute a lens drive 70.

According to the second embodiment, the zoom cam plate 61 is formed with a cam groove 61a receiving a cam pin 9a of the zooming knob 9. This cam groove 61a is linearly formed to extend along the optical axis (direction C in FIGS. 10 and 12). The zoom cam plate 61 is also formed with a cam groove 61b receiving a cam pin 7a of the zoom lens support member 7. The zoom cam plate 61 is regulated to move along arrows F and G in FIG. 10. The cam groove 61a is an example of the "first knob-side cam groove" in the present invention, and the cam groove 61b is an example of the "second knob-side cam groove" in the present invention.

According to the second embodiment, the focus cam plate 62 is formed with a cam groove 62a receiving a cam pin 10a of the focusing knob 10. This cam groove 62a is linearly formed to extend along the optical axis (direction C in FIGS. 10 and 12). The focus cam plate 62 is also provided with a cam groove 62b receiving a cam pin 8a of the focus lens support member 8. This cam groove 62b is linearly formed to incline by a prescribed angle with respect to the optical axis (direction C in FIGS. 10 and 12). The focus cam plate 62 is regulated to move along arrows F and G in FIG. 10. The cam groove 62a is an example of the "second knob-side cam groove" in the present invention, and the cam groove 62b is an example of the "second lens-side cam groove" in the present invention.

Zoom control and focus control methods in the projector 51 are now described with reference to FIGS. 10, 14 and 15.

First, zoom control is performed by varying the distance S4 (see FIG. 10) between the zoom lens 53 and the focus lens 54. In zoom control, the zooming knob 9 is rotated along arrow D in FIG. 10 from the state shown in FIG. 10, thereby also rotating the cam pin 9a of the zooming knob 9 along arrow D in FIG. 10. Therefore, the zoom cam plate 61 formed with the cam groove 61a receiving the cam pin 9a of the zooming knob 9 moves along arrow F in FIG. 10. The zoom lens 53 fixed to the zoom lens support member 7 provided with the cam pin 7a inserted into the cam groove 61b of the zoom cam plate 61 moves along arrow I in FIG. 10, guided along the cam groove 61b of the zoom cam plate 61. Consequently, the zoom lens 53 and the focus lens 54 are arranged at a distance S5 as shown in FIG. 14, for completing zoom control.

Figure 14:
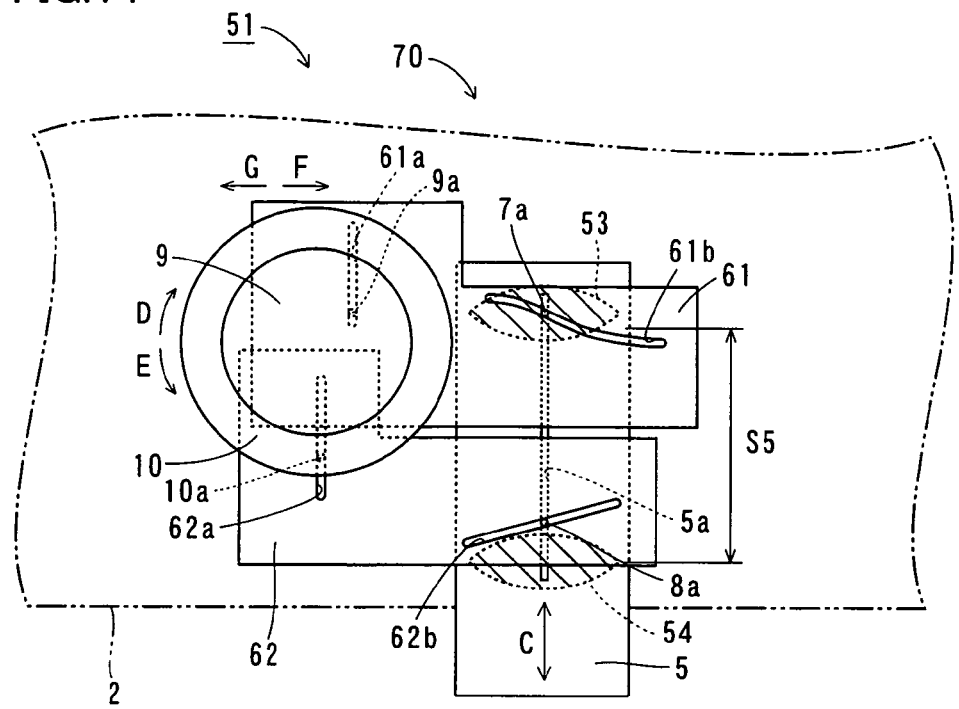
FIGS. 14 and 15 are plan views for illustrating zoom control and focus control methods in the projector according to the second embodiment of the present invention shown in FIG. 10.
Figure 15:
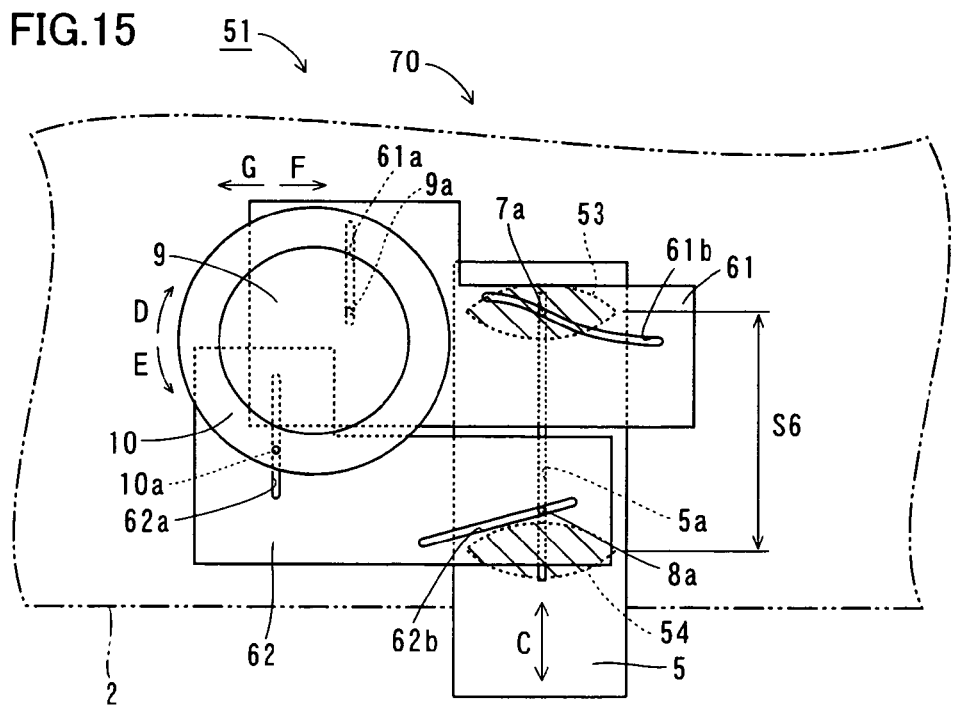
Figure 16:
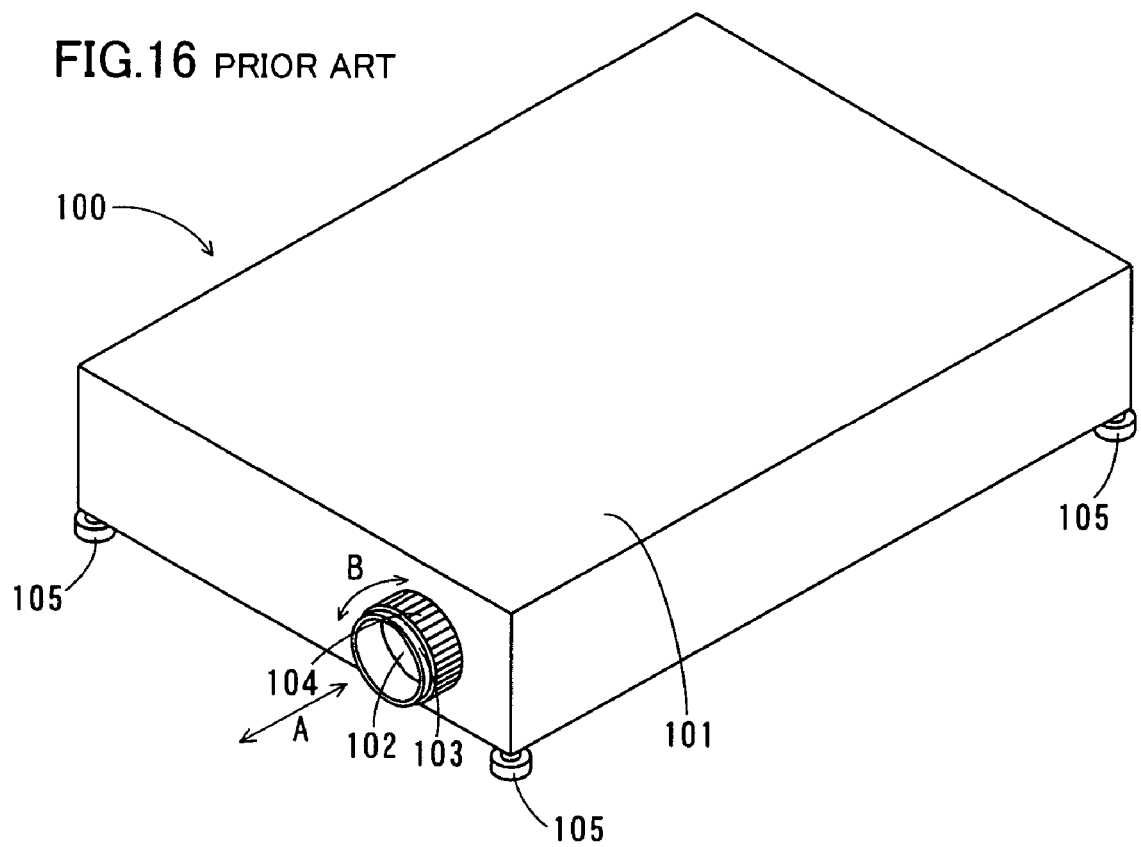
FIG. 16 is a perspective view showing the overall structure of an exemplary conventional projector.

Then, focus control is performed by moving the focus lens 54 along the optical axis (direction C in FIG. 14). In focus control, the focusing knob 10 is rotated along arrow D in FIG. 14 from the state shown in FIG. 14, thereby rotating the cam pin 10a of the focusing knob 10 along arrow D in FIG. 14. Thus, the focus cam plate 62 formed with the cam groove 62a receiving the cam pin 10a of the focusing knob 10 moves along arrow G in FIG. 14. The focus lens 54 fixed to the focus lens support member 8 provided with the cam pin 8a inserted into the cam groove 62b of the focus cam plate 62 moves along arrow I in FIG. 14, guided along the cam groove 62b of the focus cam plate 62. Consequently, the zoom lens 53 and the focus lens 54 are arranged at a distance S6 as shown in FIG. 15, for completing focus control.

According to the second embodiment, as hereinabove described, the zoom lens 53 and the focus lens 54 can be independently moved respectively by rotating the zooming knob 9 thereby moving the zoom cam plate 61 for moving the zoom lens 53 along the optical axis thereof following this movement of the zoom cam plate 61 thereby rotating the focusing knob 10 for moving the focus cam plate 62 while moving the focus lens 54 along the optical axis thereof following this movement of the focus cam plate 62. Consequently, a projected image can be zoom-controlled and focus-controlled by moving the zoom lens 53 and thereafter moving the focus lens 54.

Although the present invention has been described and illustrated in detail, it is clearly understood that the same is by way of illustration and example only and is not to be taken by way of limitation, the spirit and scope of the present invention being limited only by the terms of the appended claims.

For example, while each of the aforementioned embodiments has been described with reference to the projector comprising the lens drive, the present invention is not restricted to this but is also applicable to a projection machine or the like comprising a lens drive, other than the projector.

While each of the aforementioned first and second embodiments is provided with a single zoom lens and a single focus lens, the present invention is not restricted to this but a plurality of zoom lenses and a plurality of focus lenses may alternatively be employed.

In each of the first and second embodiments comprising the plurality of cam plates, a spring member may be arranged between the cam plates for suppressing backlash therebetween.

What is claimed is:

1. A lens drive for moving a lens arranged in a housing, comprising:

a rotating knob located out of the optical axis of said lens with a rotation axis unparallel to the optical axis of said lens and arranged outside said housing;

a knob-side cam pin provided on said rotating knob;

a lens-side cam pin provided to integrally move with said lens; and a cam plate arranged in said housing and formed with a knob-side cam groove receiving said knob-side cam pin and a lens-side cam groove receiving said lens-side cam pin, wherein said lens includes a first lens and a second lens, said rotating knob has a first rotating knob and a second rotating knob, said knob-side cam pin includes a first knob-side cam pin provided on said first rotating knob and a second knob-side cam pin provided on said second rotating knob, said lens-side cam pin includes a first lens-side cam pin provided to integrally move with said first lens and a second lens-side cam pin provided to integrally move with said second lens, said cam plate includes a first cam plate provided with a first knob-side cam groove receiving said first knob-side cam pin and a first lens-side cam groove receiving said first lens side cam pin and movable linearly along a direction intersecting with the direction of the optical axis, and a second cam plate provided with a second knob-side cam groove receiving said second knob-side cam pin and a second lens-side cam groove receiving said second lens-side cam pin and movable linearly along said optical axis and along said direction intersecting with the direction of said optical axis, said first rotating knob is so rotated as to move said first cam plate linearly along said direction intersecting with the direction of said optical axis for moving said first lens along the optical axis of said first lens following this movement of said first cam plate, and said second rotating knob is so rotated as to move said second cam plate linearly along said direction intersecting with the direction of said optical axis for moving said second lens along the optical axis of said second lens following this movement of said second cam plate.

2. The lens drive according to claim 1, wherein the rotation axis of said rotating knob is arranged substantially perpendicularly to the optical axis of said lens.

3. The lens drive according to claim 1, wherein said cam plate further includes a coupling cam plate for interlocking said first cam plate and said second cam plate, and said second cam plate is moved by movement of said coupling cam plate interlocking with said first cam plate, and said second lens moves along the optical axis of said second lens following the movement of said second cam plate.

4. The lens drive according to claim 3, wherein
said coupling cam plate is provided with a first coupling cam pin while said second cam plate is provided with a second coupling cam pin, and
said first cam plate is provided with a first coupling cam groove receiving said first coupling cam pin of said coupling cam plate while said coupling cam plate is provided with a second coupling cam groove receiving said second coupling cam pin of said second cam plate.

5. The lens drive according to claim 4, wherein
said second cam plate is movable at least along a direction intersecting with the direction of said optical axis, and
said second coupling cam groove of said coupling cam plate is formed to extend in said direction intersecting with the direction of said optical axis.

6. The lens drive according to claim 1, wherein
said first lens-side cam groove of said first cam plate receiving said first lens-side cam pin is curvedly formed.

7. The lens drive according to claim 1, wherein
said first rotating knob is discoidally formed,
said second rotating knob is annularly formed to enclose the outer periphery of said discoidal first rotating knob, and
said first rotating knob and said second rotating knob are independently rotatably arranged outside said housing respectively.

8. The lens drive according to claim 1, further comprising a frame including a slot formed to extend along said optical axis for receiving said first lens-side cam pin and said second lens-side cam pin movably along said optical axis.

9. A projector comprising a lens drive for moving a lens arranged in a housing, including:
a rotating knob located out of the optical axis of said lens with a rotation axis unparallel to the optical axis of said lens and arranged outside said housing;
a knob-side cam pin provided on said rotating knob;
a lens-side cam pin provided to integrally move with said lens; and
a cam plate arranged in said housing and formed with a knob-side cam groove receiving said knob-side cam pin and a lens-side cam groove receiving said lens-side cam pin, wherein
said lens includes a first lens and a second lens,
said rotating knob has a first rotating knob and a second rotating knob,
said knob-side cam pin includes a first knob-side cam pin provided on said first rotating knob and a second knob-side cam pin provided on said second rotating knob,
said lens-side cam pin includes a first lens-side cam pin provided to integrally move with said first lens and a second lens-side cam pin provided to integrally move with said second lens,
said cam plate includes a first cam plate provided with a first knob-side cam groove receiving said first knob-side cam pin and a first lens-side cam groove receiving said first lens side cam pin and movable linearly along a direction intersecting with the direction of the optical axis, and a second cam plate provided with a second knob-side cam groove receiving said second knob-side cam pin and a second lens-side cam groove receiving said second lens-side cam pin and movable linearly along said optical axis and along said direction intersecting with the direction of said optical axis,
said first rotating knob is so rotated as to move said first cam plate linearly along said direction intersecting with the direction of said optical axis for moving said first lens along the optical axis of said first lens following this movement of said first cam plate, and
said second rotating knob is so rotated as to move said second cam plate linearly along said direction intersecting with the direction of said optical axis for moving said second lens along the optical axis of said second lens following this movement of said second cam plate.

10. A projector comprising a lens drive, comprising a first lens and a second lens arranged in a housing, a first lens support member for supporting said first lens and a second lens support member for supporting said second lens, a first rotating knob and a second rotating knob located out of the optical axis of said first lens and said second lens and arranged on the upper surface of said housing with a rotation axis unparallel to the optical axis of said first lens and said second lens, a first cam plate and a second cam plate arranged in said housing and a coupling cam plate for interlocking said first cam plate and said second cam plate, wherein
said first rotating knob is provided with a first knob-side cam pin while said second rotating knob is provided with a second knob-side cam pin,
said first lens support member is provided with a first lens-side cam pin while said second lens support member is provided with a second lens-side cam pin,
said first cam plate includes a first knob-side cam groove receiving said first knob-side cam pin and a first lens-side cam groove receiving said first lens-side cam pin while said second cam plate includes a second knob-side cam groove receiving said second knob-side cam pin and a second lens-side cam groove receiving said second lens-side cam pin,
said coupling cam plate is provided with a first coupling cam pin while said second cam plate is provided with a second coupling cam pin,
said first cam plate is provided with a first coupling cam groove receiving said first coupling cam pin of said coupling cam plate while said coupling cam plate is provided with a second coupling cam groove receiving said second coupling cam pin of said second cam plate,
said first lens-side cam groove of said first cam plate receiving said first lens-side cam pin is curvedly formed,
said first rotating knob is so rotated as to move said first cam plate for moving said first lens along the optical axis of said first lens following this movement of said first cam plate and moving said coupling cam plate interlocking with said first cam plate thereby moving said second cam plate for moving said second lens along the optical axis of said second lens following this movement of said second cam plate in zoom control, and
said second rotating knob is so rotated as to move said second cam plate for moving said second lens along the optical axis of said second lens following this movement of said second cam plate in focus control.

11. The projector comprising a lens drive according to claim 10, wherein
the rotation axis of said first rotating knob and said second rotating knob is arranged substantially perpendicularly to the optical axis of said first lens and said second lens.

12. The projector comprising a lens drive according to claim 10, wherein
said first rotating knob is discoidally formed,
said second rotating knob is annularly formed to enclose the outer periphery of said discoidal first rotating knob, and
said first rotating knob and said second rotating knob are independently rotatably arranged outside said housing respectively.

13. The projector comprising a lens drive according to claim 10, further comprising a frame for movably arranging said first lens support member and said second lens support member, wherein said frame includes a slot formed to extend along said optical axis for receiving said first lens-side cam pin of said first lens support member and said second lens-side cam pin of said second lens support member.

14. The projector comprising a lens drive according to claim 10, wherein said second cam plate is movable at least along a direction intersecting with the direction of said optical axis, and said second coupling cam groove of said coupling cam plate is formed to extend in said direction intersecting with the direction of said optical axis.

* * * * *